Sept. 26, 1961   J. B. FRYAR   3,001,599
COLLAPSIBLE MOTOR SCOOTER
Original Filed March 15, 1956   2 Sheets-Sheet 1

INVENTOR.
James B. Fryar
BY
C. M. McKeight
ATTORNEY

Sept. 26, 1961 J. B. FRYAR 3,001,599
COLLAPSIBLE MOTOR SCOOTER
Original Filed March 15, 1956 2 Sheets-Sheet 2

INVENTOR.
James B. Fryar
BY

ATTORNEY

United States Patent Office 3,001,599
Patented Sept. 26, 1961

3,001,599
COLLAPSIBLE MOTOR SCOOTER
James B. Fryar, 1122 S. 119 East Ave., Tulsa, Okla.
Substituted for abandoned application Ser. No. 571,693, Mar. 15, 1956. This application June 25, 1959, Ser. No. 823,802
1 Claim. (Cl. 180—33)

This invention relates to improvements in a motor vehicle and more particularly, but not by way of limitation, to a collapsible motor scooter which may be readily partially dissembled for convenient storage in a relatively small space to facilitate portable transportation thereof. This application is a substitute application for my previously abandoned application Serial Number 571,693, filed March 15, 1956, and entitled "Collapsible Motor Scooter."

Power driven small and light weight vehicles are becoming increasingly popular throughout many sections of the world. The motor scooter, in particular, has come into wide spread usage not only to facilitate transportation in crowded urban areas, such as for merchandise deliveries and the like, but also for pleasure riding. The present invention contemplates a motor scooter which may be readily collapsed for storage in the luggage compartment of a car or airplane in order to facilitate portable transportation of the scooter from one location to another, or to permit taking it along on family vacation trips. The novel scooter is of a light weight construction to provide for ease of carrying, and may attain speeds of thirty-five or forty miles per hour. The scooter is provided with a gearless speed change mechanism which eliminates the need for a transmission. Thus, no gear shift assembly or clutch member is required in the construction of the scooter, thereby greatly simplifying the operation thereof.

It is, therefore, an important object of this invention to provide a motor scooter which may be readily partially dissembled to facilitate portability thereof.

It is another object of this invention to provide a novel motor scooter so designed and constructed to eliminate the necessity of a transmission, thereby providing for simplicity of operation.

It is still another object of this invention to provide a motor scooter of light weight construction for facilitating manual handling thereof.

It is a further object of this invention to provide a light weight collapsible motor scooter of durable and economical construction and simple and efficient in operation.

Other objects and advantages of the invention will be evident from the following detailed description, read in conjunction with the accompanying drawings, which illustrate my invention.

Figure 5:
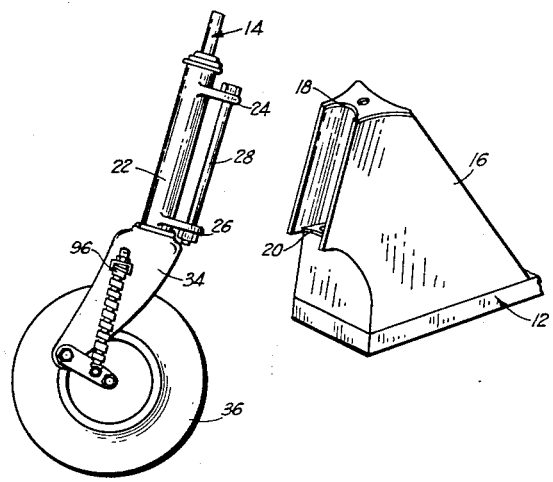
FIGURE 5 is a perspective view of the lower portion of the front wheel assembly detached from the scooter body.

Referring to the drawings in detail, reference character 10 generally refers to a motor scooter comprising a body portion or frame member 12 removably secured to a front wheel assembly 14. The frame 12 is provided with a substantially yoke shaped front member 16, shown in perspective in FIG. 5, provided with vertically spaced arcuate portions 18 and 20 adapted for disposition adjacent a tubular sleeve 22 of the wheel assembly 14. The sleeve member 22 is provided with a pair of vertically spaced apertured flange members 24 and 26 for cooperating with a bolt member 28 to retain the yoke member 16 in position adjacent the sleeve 22 in the assembled motor scooter 10. It will be apparent that the bolt 28 may be readily removed in order to disconnect the yoke 16 from the wheel assembly 14.

Figure 4:
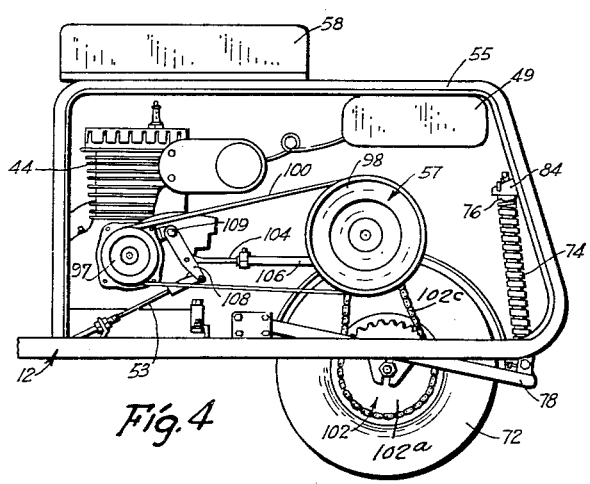
FIGURE 4 is a side elevational detail view of the power and speed change mechanism of the invention.
Figure 10:
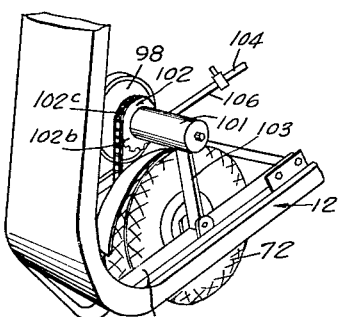
FIGURE 10 is a perspective view of a portion of the scooter depicting the rear wheel from the opposite side of that shown in FIG. 4.
Figure 7:
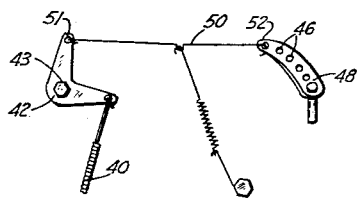
FIGURE 7 is a detail view of the throttle control means for the scooter.

The wheel assembly 14 comprises a steering column or rod 30 having a handle bar assembly 32 provided at the top thereof in any well known manner. The steering column 30 is journaled within the sleeve member 22 in any suitable manner (not shown) so that the sleeve 22 is disposed at the lower portion of the steering column 30. A downwardly extending yoke member 34 is rigidly secured to the steering rod 30 immediately below the sleeve 22 for receiving a wheel 36 therein in any well known manner. A flexible gas feed or throttle control cable 38 is secured at one end of the handle bar assembly 32 and extends downwardly adjacent the steering column 30 into the proximity of the frame yoke member 16. A cooperating throttle cable 40 (FIG. 7) is coupled at one end to the cable 38 in the proximity of the yoke 16 and is connected at the other end to a bell crank 42 which is pivotally secured at 43 in the proximity of the motor or power plant generally indicated at 44 (FIG. 4). This coupling construction of the flexible cables 38 and 40 provides for disconnection thereof when removing the yoke portion 16 from the sleeve member 22 for disassembly of the scooter 10, as will be hereinafter set forth. A plurality of spaced apertures 46 (FIG. 7) are provided on a carburetor lever arm 48 which is normally provided with the power plant 44 for control of the carburetor portion. A rod member 50 has one end pivotally secured at 51 to the bell crank 42, and the opposite end 52 thereof is adapted to be disposed within one of the apertures 46. Tension manually applied to the throttle cable 38 is transmitted through the cable 40 coupled thereto for pivoting the bell chank 42 in a clockwise direction. The rod 50 transmits the motion of the bell crank 42 to the lever arm 48 for actuation of the carburetor (not shown). It will be apparent that the end 52 of the rod 50 may be disposed in any one of the apertures 46 required to provide the desired stroke length for the carburetor lever 48 for supplying fuel from the gas tank 49 to the motor. A flexible clutch cable 53 is provided adjacent the steering column 30 and extends to the drive assembly for actuation therof as will be hereinafter set forth. The clutch cable may be manually disconnected from the scooter in the vicinity of the handle bar assembly 32 to facilitate disassembly of the scooter.

Figure 1:
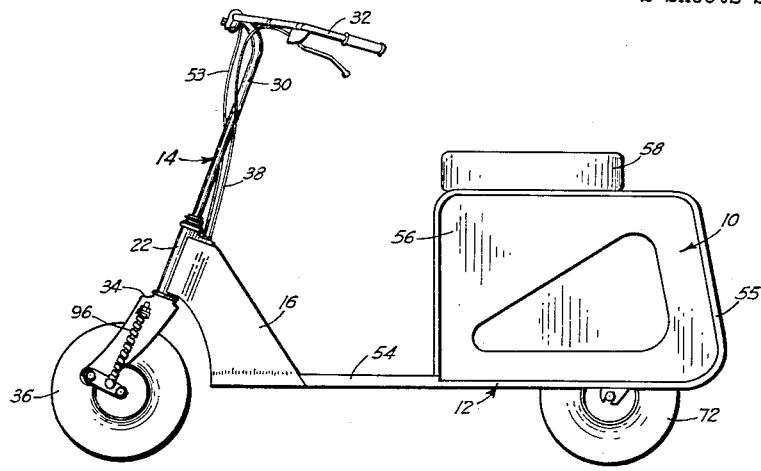
FIGURE 1 is a side elevational view of a motor scooter embodying the invention.
Figure 8:
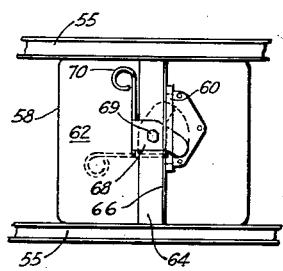
FIGURE 8 is a view of the underside of the scooter seat member and depicts the latching means therefor.
Figure 9:
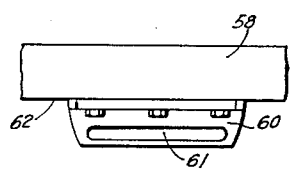
FIGURE 9 is a detail view of a portion of the seat latching means.

The frame portion 12 extends downwardly from the yoke member 16 to provide a substantially flat foot rest portion 54 (FIG. 1). The frame 12 is provided with a pair of spaced upright rectangular frame members 55 at the rear of the scooter 10 for supporting a housing 56. The housing 56 encases the power plant 44, gas tank 49 and drive mechanism, generally indicated at 57, as will be hereinafter set forth. A seat member 58 is provided immediately above the frame members 55, and is preferably suitably covered and padded for comfort. Referring to FIGS. 8 and 9, a downwardly extending flange member 60 having an elongated slot 61 provided therein is bolted, or the like, to the underside 62 of the seat 58. An angle iron cross member 64 is rigidly secured between the spaced frame members 55 by welding, or the like (not shown) in such a manner that one leg 66 of the cross member 64 extends downwardly from the underside 62 of the seat 58. An elongated slot (not shown) similar to the slot 61 is provided in the leg 66 and is in substantial alignment therewith when the seat 58 is disposed on the frame members 55 in such a manner that the flange 60 is adjacent the leg 66 of the cross member 64. A lever member 68 is pivotally secured at 69 to the cross member 64, and is provided with a handle 70 for manual actuation thereof. The lever member 68 extends through the aligned slots, as shown in full lines in FIG. 8, to hold the seat 58 securely in position on the scooter 10. It will be noted that forward movement of the seat 58 with respect to the scooter 10 is limited by the physical contact of the flange 60 against the leg 66 of the cross member 64. Rearward movement of the seat 58 is substantially limited by the locking position of the lever 68 within the aligned slots, however, it will be apparent that the housing 56 may be so designed to contact the rear edge of the seat 58 to preclude rearward movement thereof. The lever 68 may be manually rotated in a clockwise direction by the handle 70 to the position shown in dotted lines in FIG. 8 in order to move the lever 68 out of engagement with the aligned slots, thereby releasing the seat 58 from the scooter 10 for removal therefrom.

Figure 6:
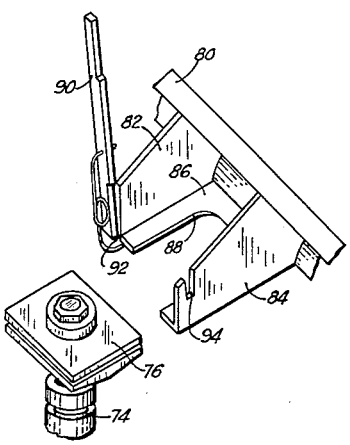
FIGURE 6 is a perspective view of the releasing means of the rear wheel of the scooter.

A rear wheel 72 is suspended within the housing 56 by means of a covered spring member 74 (FIGS. 4 and 6). The spring 74 is secured at one end to a block member 76 and at the other end to a wheel support member 78. Referring to FIG. 6, a cross brace member 80 is rigidly secured between the spaced frame members 55 substantially media the rear portion thereof. A pair of inwardly directed spaced vertical flanges 82 and 84 are provided on the cross brace member 80. A substantially horizontal plate member 86 having a recess 88 therein is provided between the flanges 82 and 84. A spring urged latch member 90 is pivotally secured at 92 to the outer end of the flange 82 and is adapted to be manually rotated to alternate positions of open (shown in FIG. 6) and closed (not shown). The latch member 90 in a closed position rests in a groove 94 provided in the upper edge of the flange 84. The block 76 is manually disposed on the plate 86 to secure the block to the scooter 10. The latch 90 is rotated to a closed position and rests within the groove 94 to retain the block 76 securely on the plate 86 between the brace member 80 and the latch 90. The recess 88 provides clearance for the spring 74 extending downwardly from the block 76, thereby permitting the block to be placed on the plate 86 in such a manner as to provide clearance for closing of the latch member 90.

Figure 2:
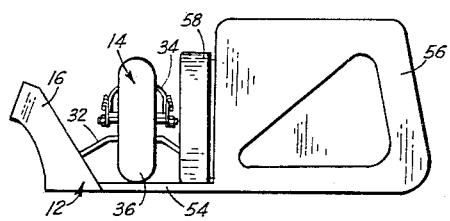
FIGURE 2 is a side elevational view of the novel motor scooter in a collapsed position for portability.
Figure 3:
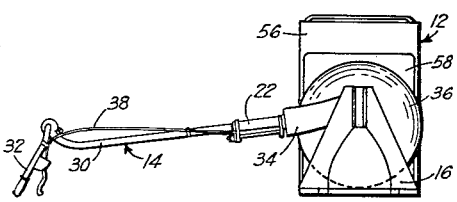
FIGURE 3 is an end elevational view of the novel motor scooter in a collapsed position for portability.

The rear wheel 72 is supported by the spring 74 and the wheel support member 78 when the block 76 is secured on the plate 86, as clearly shown in FIG. 4. When it is desired to collapse the scooter for portability, the latch member 90 is raised to an open position, the block member 76 is manually removed from disposition on the plate 86. This releases the spring 74 from engagement with the scooter and permits the rear wheel 72 to move upwardly within the housing 56 to an out of the way position. As seen in FIGS. 2 and 3, the rear wheel is completely encased within the housing 56 during portability of the scooter 10.

The suspension support of the rear wheel 72 as shown herein provides a shock absorber for the rear wheel to facilitate ease of riding the scooter 10. It will be seen in FIGS. 1 and 5 that the front wheel 36 is provided with a spring member 96 for providing substantially the same shock absorbing operation for the front wheel.

Referring now to FIG. 4, the drive mechanism 57 comprises a pair of spaced pulley members 97 and 98 and an endless belt member 100 therebetween. The drive pulley 97 is suitably removably secured to the motor 44 for rotation thereby. The follower pulley 98 is connected to the rear wheel 72 by a suitable sprocket and chain drive assembly 102. The sprocket and chain drive assembly 102 may be of any well known combination of elements and as depicted herein may comprise a pair of spaced sprocket members 102a and 102b having the usual chain member 102c extending therebetween. The sprocket 102b may be provided with an axially extending hub member 101 having a radially extending leg or arm member 103 suitably secured to the wheel support member 78. A second radially extending arm (not shown) may be provided for the hub member 101 and secured to the support member 78 oppositely disposed from the arm 103, if desired, for spanning the wheel 72 and adding rigidity to the sprocket assembly structure 102. Rotational movement of the drive pulley 97 is transmitted through the belt 100 to the follower pulley 98 and through the chain and sprocket assembly 102 to the rear wheel 72. The pulley members 97 and 98 are spaced apart by means of a pair of telescoping members 104 and 106. It is apparent that the shaft of pulley 98 is journalled in member 106 in any well known manner (not shown). A plurality of drive pulleys of various diameters, only one of which is depicted herein, are provided which may be manually interchanged on the motor 44 as desired to provide variable size ratios between the drive pulley and the follower pulley to alter the speed attainable by the scooter 10. It is preferable to provide three drive pulleys of variable diameters to obtain pulley ratios corresponding to the low speed, intermediate speed and high speed of a conventional gear type transmission. The operation of manually changing drive pulleys can be accomplished in a minimum of time. The combination of speed changes provided by the variety of pulley size ratios and the various throttle control changes, as hereinbefore set forth, provide for a large variety of speed changes and throttle speeds, as desired.

It will be apparent that a change of diameter of the drive pulley 97 will alter the belt size required to rotate the follower pulley 98. In order to overcome this disadvantage, the members 104 and 106 may be manually telescoped to alter the distance between the pulleys 97 and 98, thereby permitting utilization of one belt member 100 for all drive pulley sizes. It will further be apparent that the center of the drive pulley 97 must remain stationary with respect to the motor 44, therefore the position of the follower pulley 98 is altered by telescopic movement of the members 104 and 106 to shorten or lengthen the distance between pulley centers, as required.

A lever arm 108 has one end pivotally secured at 109 in the proximity of the drive pulley 97, and the opposite end thereof connected with the clutch cable 53 whereby manual manipulation of the cable 53 in one direction will rotate the lever arm 108 in a clockwise direction about the pivot point 109, and a manipulation of the cable 53 in an opposite direction will rotate the lever arm in a counterclockwise direction around the pivot. The telescopic assembly 104—106 is secured to the lever arm 108 between the opposed ends thereof, as clearly shown in FIG. 4, and is moved in alternate right and left hand directions upon rotation of the lever arm 108. When the lever 108 is rotated in a clockwise direction, as viewed in the drawings, the telescopic members 104 and 106 are moved in a left hand direction for moving the follower pulley 98 in a direction toward the drive pulley 97, thus relieving the tension on the belt 100 and providing a neutral position for the drive mechanism 59. When the lever 108 is rotated in a counter-clockwise direction, the telescopic members 104 and 106 are moved in a right hand direction for moving the pulley 98 away from the pulley 97 and restoring the tension on the belt 100 to place the drive mechanism 57 in a drive position. Any suitable braking means (not shown) may be provided for stopping forward or rearward motion of the scooter 10 in use.

The assembled motor scooter 10, as shown in FIG. 1, weighs approximately one hundred sixteen pounds and will attain speeds of thirty-five or forty miles per hour. The light weight construction provides for ease of handling during portable transportation thereof. In order to readily disassemble the scooter for portability, the front wheel assembly 14 may be readily removed from the frame 12 by removal of the bolt 28 as hereinbefore set forth. It is preferable to replace the bolt in position on the flanges 24 and 26 of the sleeve 22 to substantially preclude accidental loss thereof during transporting of the motor scooter. The latch 68 may be manually rotated to release the seat 58 from engagement with the scooter and permit removal thereof. The removed front wheel assembly 14 and the seat 58 may be conveniently disposed on the foot rest portion 54 as clearly shown in FIGS. 2 and 3. The block member 76 may be released from disposition on the plate 86 by raising the latch member 90, as hereinbefore set forth, to release the spring 74. In this manner, the rear wheel 72 is released to permit an upward movement thereof within the housing 56. In this partially disassembled position the motor scooter 10 may be easily disposed within a luggage compartment of a car (not shown), or the like, for portable transportation of the scooter.

From the foregoing, it will be apparent that the present invention provides a novel light weight motor scooter which may be readily partially disassembled to facilitate portable transportation thereof. The novel motor scooter is provided with a pulley speed change construction which eliminates the need for a clutch assembly or gear transmission, thereby providing a motor scooter of a durable and economical construction and simple and efficient in operation.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A collapsible motor scooter comprising a steering assembly journaled in a tubular sleeve member, a frame member removably secured to the sleeve member, a seat member removably secured to the frame member, a housing supported by the frame, a prime mover disposed within the housing, a rear wheel, means for removably suspending the wheel within the housing, said means comprising a wheel support member, a helical spring secured thereto and having a block member at the opposite end thereof, means for holding the block member to the frame member, latch means cooperating with the last mentioned means for alternately securing and releasing the block member to permit the removable suspension of the wheel within the housing, means for transmitting power from the prime mover to the rear wheel, said power transmitting means comprising a drive pulley removably secured to the prime mover for rotation thereby, a follower pulley connected to the drive pulley for rotation thereby, said follower pulley adapted to rotate the rear wheel, and means for intermittently interconnecting the drive and follower pulley members.

References Cited in the file of this patent

UNITED STATES PATENTS

| | | |
|---|---|---|
| 1,061,420 | Sunvold et al. | May 13, 1913 |
| 2,696,272 | Schlaphoff | Dec. 7, 1954 |
| 2,839,146 | Bouffort | June 17, 1958 |
| 2,910,130 | Schlaphoff | Oct. 27, 1959 |